(No Model.) 4 Sheets—Sheet 2.
E. H. EVERETT.
MACHINE FOR SHAPING BOTTLE NECKS.
No. 400,555. Patented Apr. 2, 1889.
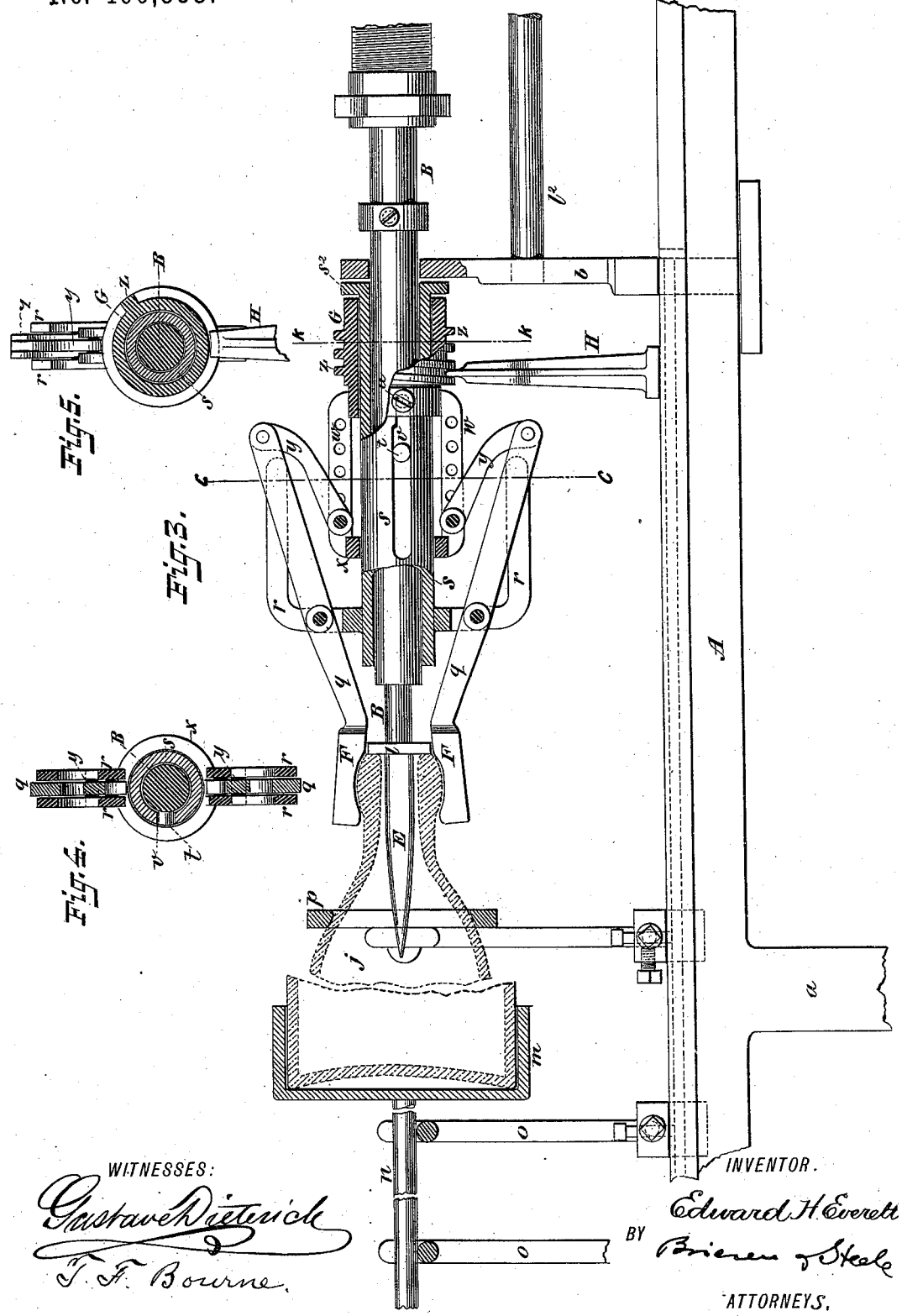
WITNESSES:
Gustave Dieterich
T. F. Bourne.
INVENTOR.
Edward H. Everett
BY
Brieren & Steele
ATTORNEYS.

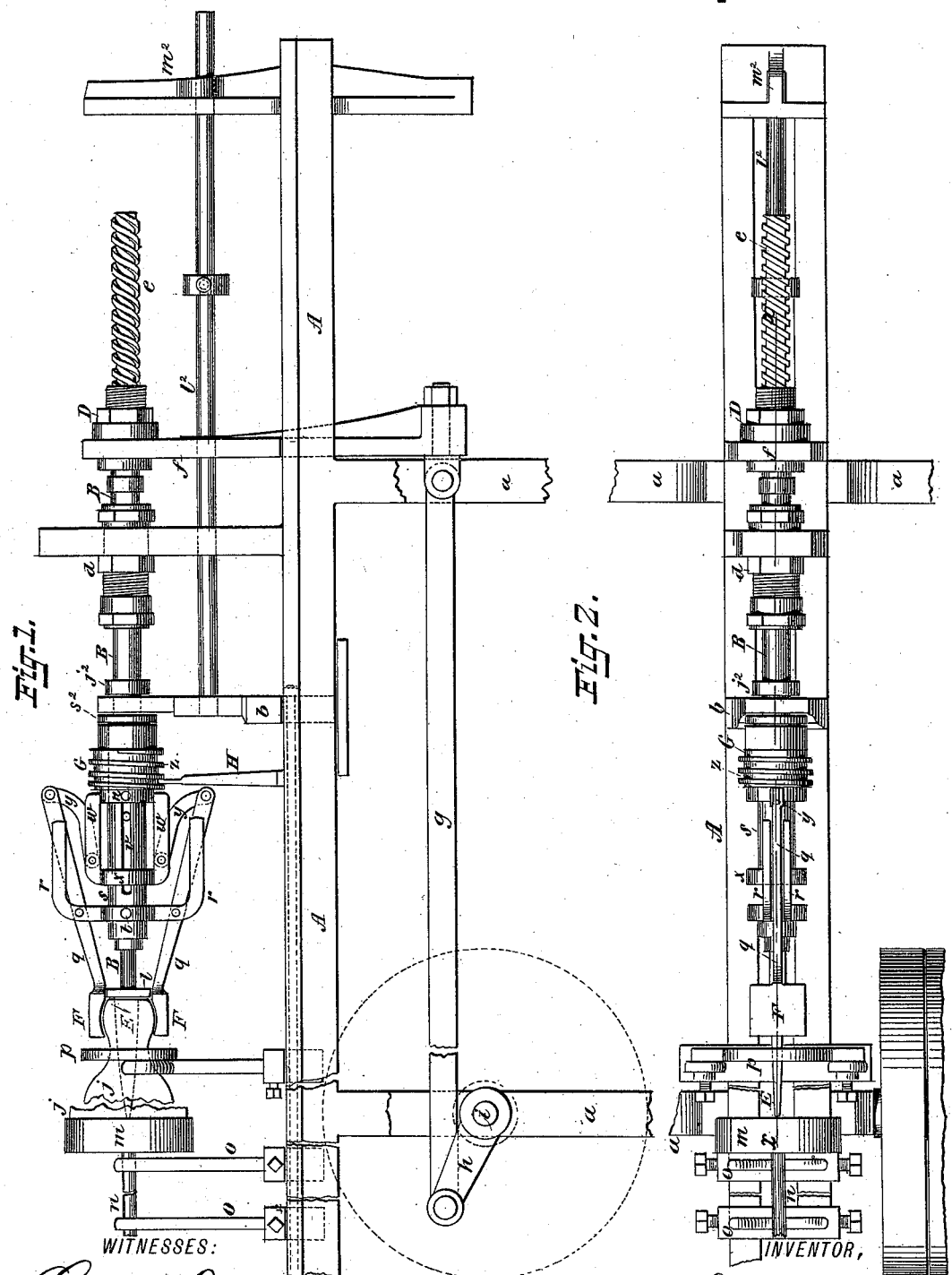

(No Model.)  
4 Sheets—Sheet 3.
E. H. EVERETT.
MACHINE FOR SHAPING BOTTLE NECKS.
No. 400,555.  
Patented Apr. 2, 1889.
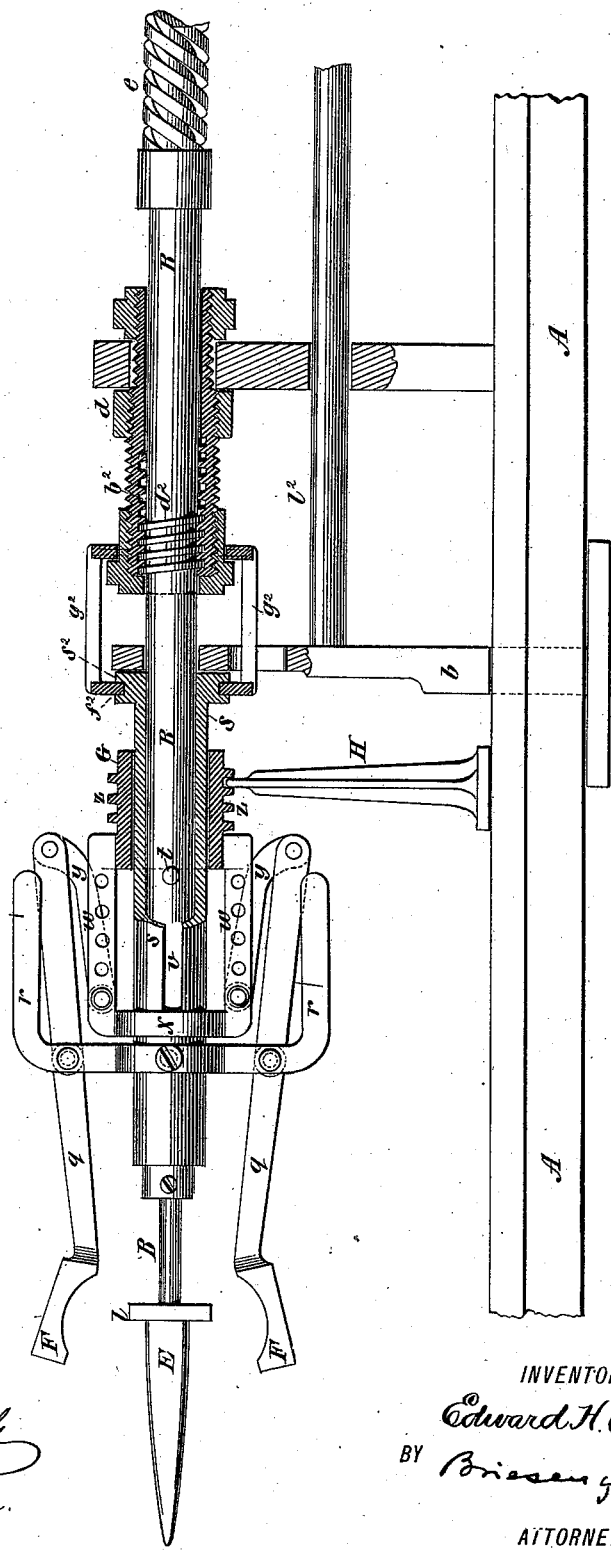
WITNESSES:  
Gustave Dieterich  
T. F. Bourne.
INVENTOR,  
Edward H. Everett  
BY Briesen & Steele  
ATTORNEYS.

(No Model.)
4 Sheets—Sheet 4.
E. H. EVERETT.
MACHINE FOR SHAPING BOTTLE NECKS.
No. 400,555.
Patented Apr. 2, 1889.
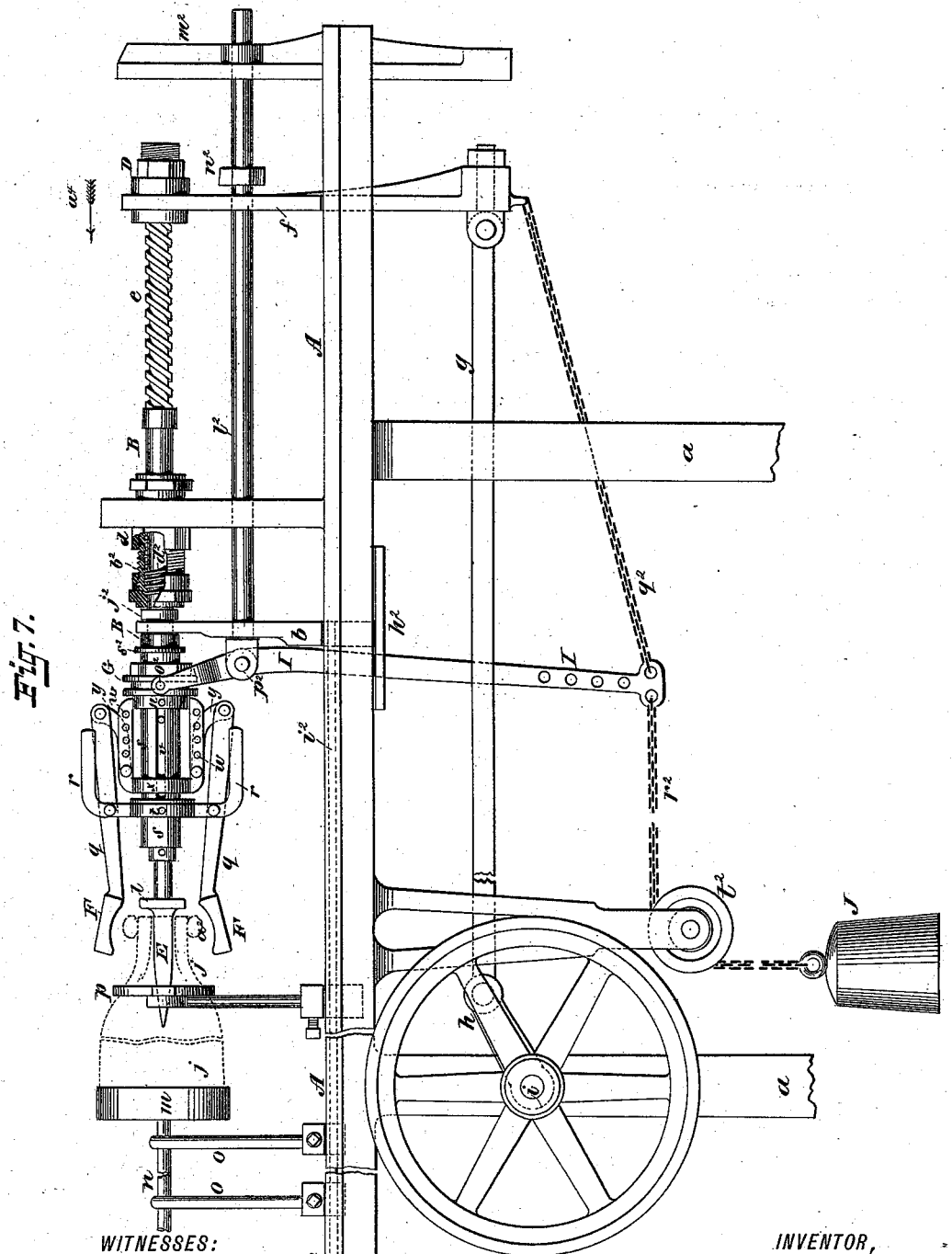
WITNESSES:
Gustave Dieterich
T. F. Bourne
INVENTOR,
Edward H. Everett
BY Briesen & Steele
ATTORNEYS

UNITED STATES PATENT OFFICE.

EDWARD H. EVERETT, OF NEWARK, OHIO.

MACHINE FOR SHAPING BOTTLE-NECKS.

SPECIFICATION forming part of Letters Patent No. 400,555, dated April 2, 1889.

Application filed March 30, 1888. Serial No. 268,959. (No model.)

*To all whom it may concern:*

Be it known that I, EDWARD H. EVERETT, of Newark, Licking county, Ohio, have invented an Improved Machine for Shaping Bottle-Necks, of which the following is a specification.

The object of my invention is to provide an improved machine for shaping bottle-necks. The invention consists in a rotating spindle that has a plug or core at one end adapted to enter a bottle-neck, combined with rotating opening and closing shaping-jaws that are adapted to close upon the neck of a bottle and in their rotation around said bottle-neck to give the desired shape thereto.

The invention also consists in means for opening and closing the shaping-jaws during rotation; also, in means for advancing the bottle, when a movable bottle-support is employed, in unison with the advance of the spindle.

The invention further consists in the details of improvement and the combinations of parts that are more fully hereinafter set forth.

Reference is to be had to the accompanying drawings, forming part of this specification, in which—

Figure 1 is a side elevation, partly broken, of a machine for shaping bottle-necks constructed according to my invention. Fig. 2 is a plan view of the same. Fig. 3 is an enlarged detail view, partly in section, showing the mechanism for opening and closing the shaping-jaws. Fig. 4 is a vertical cross-section on the line $c\ c$, Fig. 3. Fig. 5 is a vertical cross-section on the line $k\ k$, Fig. 3. Fig. 6 is a side elevation, partly in section, of a modification of my machine, showing means for advancing the spindle; and Fig. 7 is a side elevation, partly broken, showing another modification of my machine adjusted so that both the spindle and shaping-jaws may advance, also showing a modified arrangement for actuating the shaping-jaws.

In the accompanying drawings, the letter A represents a base or guide plate that is mounted upon suitable supports, $a$.

B is a spindle or shaft that is journaled in bearings $b\ d$, supported by the base A. The spindle B is rotated as follows: At one part said spindle is provided with a worm, $e$, that receives a nut or sleeve D, having corresponding internal threads, or a pin, that fit in said worm. This nut or sleeve D is secured to a longitudinally-movable arm, $f$, that projects from the base or guide plate A. To this arm $f$ is secured a connecting-rod, $g$, that is pivoted to a crank, $h$, on a shaft, $i$, suitably journaled in the supports $a$, or otherwise carried. The shaft $i$ is driven by belt and pulley from suitable source, or by other suitable means. As the shaft $i$ rotates, the nut or sleeve D, through the connecting-rods $f\ g$ and crank $h$, will be reciprocated without turning. As the sleeve D is thus reciprocated, its internal threads, working in the worm $e$, will rotate the spindle B alternately in opposite directions; but, if preferred, the spindle B could be rotated directly by belt and pulley or other suitable gear.

At the opposite end the spindle B carries a plug or core, E, that is adapted to enter the mouth of a bottle, $j$. At its inner end the plug or core E preferably has a plate or stop, $l$, that limits the passage of the core into the bottle-neck. The base of the bottle $j$ is held in a cup or snap, $m$, the handle or rod $n$ of which is to be rested upon supports or bearings $o$, that are carried by the guide-plate A. When a bottle $j$ is placed in position upon the core E, the neck of the bottle is or may be passed through a ring or other shaped support or bearing, $p$, that is supported on the base or guide plate A. When the bottle is in proper position upon the core E, the body portion of the bottle at the neck will fit in the ring-support $p$, as shown in Fig. 3. The supports $o\ o$ and $p$ are preferably vertically adjustable. The ring-support $p$ also acts to determine the distance the bottle-neck shall pass into the jaws F.

F F are shaping-jaws that are adapted to straddle the bottle-neck and, also, to rotate around said neck. The jaws F F are supported by or are continuations of levers $q$, that are pivoted to arms $r$, that are carried by the spindle B. I prefer to secure the arms $r$ to a sleeve, $s$, that fits on the spindle B, as clearly shown in Fig. 3. I preferably secure the sleeve $s$ to the spindle B by a set-screw, $t$.

G is a sleeve that fits over the sleeve $s$ and slides freely thereon, being guided by a screw or pin, $u$, passing from the sleeve G into a slot, $v$, in the sleeve $s$, as shown. By this screw $u$ the sleeve G is also carried around with the spindle B and sleeve $s$. A shoulder, $s^2$, on the sleeve $s$ will prevent the sleeve G slipping off the same. The sleeve G, preferably, has a skeleton extension, that consists of two rods, $w$, connecting the sleeve proper, G, with a ring, $x$, that encircles the sleeve $s$. For the purposes of this specification I consider the parts G, $w$, and $x$ as one sleeve, which I term "G."

To the sleeve G, or, more properly speaking, to the rods $w$, are pivoted links $y$, that at their other ends are pivoted to the levers $q$. When the sleeve G is moved into the rearward position, or that shown in Figs. 1, 2, and 3, the links $y$ act to press outward the outer ends of the levers $q$, and thereby crowd the jaws F toward the plug E and upon the bottle $j$ when it is in position on said plug, or upon the plate $l$, thereby limiting the movement of the sleeve G; but when the sleeve G is moved forward, or into the position shown in Figs. 6 and 7, the links $y$ act to draw inward the ends of the levers $q$, and thereby to raise the jaws F from the bottle-neck.

The sleeve G may be moved along the spindle B by a spring or by suitable means. I have shown two constructions for moving the same, one being shown in Figs. 1, 2, 3, and 6, and the other in Fig. 7.

Referring now to Figs. 1 to 6, the sleeve G is shown provided with an external worm, $z$, that receives a pointer or finger, H, that is rigidly secured to the framing of the machine. This pointer H may be rigid or slightly yielding, as desired. As the sleeve G rotates alternately in opposite directions with the spindle B, said sleeve will be moved back and forth along the spindle by the action of the worm $z$ and the pointer or finger H. Thus when the pointer H is in the end of the worm $z$ (shown in Figs. 1, 2, and 3) the sleeve G will be in the backward position and the jaws F closed; but when the pointer H is at the other end of the worm, as shown in Fig. 6, the sleeve G will have been moved forward and the jaws F opened. The speed of the sleeve G along the spindle B, and also the distance it shall travel, can be regulated by the pitch of the worm, or otherwise.

My improved machine operates in shaping a bottle-neck as follows: The bottle $j$, while in a plastic state and having a plastic glass ring, $a^2$, (see Fig. 7,) in position on the neck of the bottle, is secured in the cup or snap $m$. The bottle-neck is then passed through the support or ring $p$ and upon the plug E while the jaws F are open, the handle $n$ of the cup $m$ being placed upon the supports $o\ o$. The spindle B is now rotated in such direction by the sleeve D and its actuating-gear that the action of the worm $z$ and the pointer H will move the sleeve G to close the jaws F upon the ring $a^2$ and upon the neck of the bottle. As the jaws F in their rotation with the spindle approach the bottle-neck and ring $a^2$, they act upon the same to shape the neck. The sleeve D is now moved in the opposite direction to reverse the motion of the spindle B. The worm $z$ and pointer H now act to move the sleeve G forward to open the jaws and release the bottle-neck. As the plug E rotates within the bottle-neck, it acts to shape the interior of said neck. The length of time that the jaws shall bear upon the bottle-neck can be regulated by the shape of the worm $e$, or otherwise. Thus it will be seen that the jaws F close gradually upon the bottle-neck during rotation, and in so doing shape the neck, and then open as gradually to release the bottle; but the bottle-neck may be shaped by my machine without using a ring $a^2$.

For some styles of bottle-necks it is or may be necessary that the spindle should have a longitudinal movement as well as rotary, while the jaws F rotate without advancing. To accomplish this I provide the bearing $d$ for the spindle B with an internal worm, $b^2$, that meshes with a worm, $d^2$, on the spindle B, as clearly shown in Figs. 6 and 7. As the spindle rotates, it will be moved longitudinally by these worms. I prefer that the worm $e$ be so cut with relation to the worms $b^2\ d^2$ that as the sleeve D travels along the spindle B four inches the spindle will travel longitudinally one inch; but this relation of speeds may be changed to suit the requirements. The longitudinal movement thus imparted to the spindle B eases the friction between the worm $e$ and the sleeve D. With this construction the sleeve $s$ is held to the spindle by the screw $t$ passing through the slot $v$ in the sleeve $s$. Thereby said spindle is permitted longitudinal movement within the sleeve, while the pin $t$ acts to turn the sleeve $s$ with the spindle. To prevent longitudinal movement of the sleeve $s$, and to permit its rotation with the spindle B, I provide the shoulder $s^2$ with an annular groove, $f^2$, that receives the ends of arms $g^2$, that project from the bearing $d$. Thereby the sleeve $s$ is free to rotate, but cannot move longitudinally; but the sleeve $s$ may be otherwise swiveled so as to turn without advancing, if desired. As thus modified, the machine will act as before described, except that the plug E, while revolving within the neck of the bottle, is also moved longitudinally to produce a cylindrical opening in the neck.

If desired, the jaws F may be held so as not to rotate, while the plug E rotates and advances. The jaws may also be made to entirely clasp the bottle-neck, screw-threads or any desired device being produced on their inner faces. In this case the advancing of the plug into the bottle-neck would press the glass outward into the closed jaws, and thereby form the device on the bottle-neck that is on the inner face of the jaws.

In some cases as the spindle B advances it may also be desirable that the bottle-supports $o\ o\ p$ should advance and carry the bottle longitudinally, and that the jaws F should partake of such longitudinal motion. This modification is shown in Fig. 7. In this figure the bearing-support $b$ for the spindle B is made longitudinally movable and guided in a slot of the base A, a plate, $h^2$, being carried by it below the base A, so as to hold and guide it on the base. To this sliding bearing $b$ is also secured a rod, $i^2$, that passes along the base A, and is adjustably secured to the supports $o\ o$ and $p$, which in this case are movable on the base A. These supports, by means of set-screws, are longitudinally adjustable on the rod $i^2$. A collar, $j^2$, on the spindle B, adjacent to the bearing $b$, acts to push said bearing forward as the spindle advances, thereby imparting motion by the rod $i^2$ to the supports $o\ o$ and $p$. In the return of the spindle B the sleeve $s$, which in this case is rigid with the spindle, acts to push the bearing $b$ rearward to return the supports $o\ o$ and $p$ with the spindle. I also prefer to secure to the bearing $b$ a rod, $l^2$, that extends parallel with the spindle B, passes through the arm $f$, and is guided in a stationary support, $m^2$, at the end of the base A. Upon the rod $l^2$, I place an adjustable collar, $n^2$, that is adapted to be engaged by the arm $f$ as it returns in driving the spindle, this collar thereby acting to limit the travel of the arm $f$.

In the construction shown in Fig. 7 the sleeve $s$, as stated, is firmly secured to the spindle B by the screw $t$, so that the spindle and jaws will move lengthwise and rotate in unison, as first explained, the worms $b^2\ d^2$ being also provided to impart to the spindle and jaws F the longitudinal movement. The means for rotating the spindle B are similar to those already described; but in this figure is shown a different arrangement for moving the sleeve G to open and close the jaws F F from that shown in the other figures. In this case the worm $z$ on the sleeve G is replaced by an annular groove that receives a pin, $o^2$, on a lever, I, that is pivotally connected to the bearing $b$, as at $p^2$. The lever I may be forked, if desired, to embrace the sleeve G, there being a pin, $o^2$, for the groove at each end of the fork. The lever I extends downwardly and is attached by a chain, $q^2$, or otherwise, to the arm $f$. The lever I is also connected by a chain or other flexible connection, $r^2$, with a weight, J, said chain $r^2$ passing over a pulley, $t^2$, suitably supported by the framing of the machine. As the sleeve D advances in the direction of the arrow $a^4$, Fig. 7, to turn the spindle B, the support $b$ and its connections advance under the influence of $b^2\ d^2$ with one fourth the speed of $f$; hence the rear connection of the chain $q^2$ advances much faster than the pivot $p^2$ of said lever, and the chain $q^2$ will consequently slacken, allowing the weight J to swing said lever I on its pivot and to move the sleeve G backward and close the jaws F. As the sleeve D and arm $f$ move in the reverse direction, the chain $q^2$ will draw upon the lever I, thereby moving the upper end of said lever in the direction $a^4$ to advance the sleeve G and open the jaws F. Thus it will be seen that the action of the weight J and arm $f$, through the medium of the lever I, serves to move the sleeve G to open and close the jaws F. The lever I, being pivoted to the movable bearing $b$, always retains the proper position with relation to the spindle B and sleeve G.

By adjusting the chain up or down on the lever I the distance the sleeve G shall travel may be regulated. By lowering the chain on the lever the pressure of the jaws on the bottle-neck may be increased.

The parts may be readily changed from non-advancing spindle and jaws, Fig. 1, to advancing spindle and non-advancing jaws, Fig. 6, and to advancing spindle, advancing jaws, and advancing bottle-supports, Fig. 7.

The worm $z$ and pointer H may be used in connection with the advancing spindle and jaws (shown in Fig. 7) in place of the lever I and its connection.

With my improved machine both the inside and the outside of the bottle-neck are shaped at one time, and all strain by longitudinal or other action of the jaws on the bottle is avoided.

I have made a separate application for so much of the mechanism shown in Fig. 7 as covers the shaping-jaws, combined with means for revolving and opening and closing them, and a weighted member which will allow the jaws, when closed and in the act of closing, to yield; also, for the combination of the above with the spindle B, sleeve G, and weight J. Said application was filed in Patent Office November 9, 1888, Serial No. 290,370.

Having now described my invention, what I claim is—

1. A rotating and longitudinally-movable plug, E, adapted to enter a bottle-neck, combined with rotating jaws F, adapted to shape a bottle-neck during rotation, substantially as described.

2. A rotating and longitudinally-movable plug, E, adapted to enter a bottle-neck, combined with rotating and longitudinally-movable shaping-jaws F, as specified.

3. A rotating and longitudinally-movable plug, E, for entering a bottle-neck, combined with rotating and longitudinally-movable jaws F, and with movable supports for a bottle that advance with the plug, as specified.

4. The rotating spindle B, having the plug E, and sleeve $s$, surrounding said spindle, combined with the shaping-jaws F and sleeve G, which is flexibly connected to said jaws, substantially as described.

5. The spindle B, having plug E, sleeve, and supporting-arms $r$ on said sleeve, combined with the shaping-jaws F, levers $q$, carrying said jaws and pivoted in the arms $r$, and with the sleeve G and links $y$, substantially as described.

6. The rotating spindle B and rotating opening and closing clamping-jaws F, combined with the bottle-support $o$ and the gaging and centering ring $p$, substantially as described.

7. The spindle B, having worms $e$ and $d^2$, combined with the sleeve D, having internal threads that fit said worm $e$, means, substantially as described, for reciprocating said sleeve D, and with the stationary bearing $d$, having internal threads, $b^2$, that fit the worm $d^2$, whereby said spindle will be rotated and advanced simultaneously, substantially as described.

8. The spindle B, having worm $e$, reciprocating sleeve D, having internal threads meshing with the worm $e$, and means, substantially as described, for reciprocating said sleeve, combined with the rotating opening and closing jaws F, that are carried by the spindle B, substantially as described.

9. The rotating advancing spindle B, combined with the movable bearing $b$, that is actuated during the advance of said spindle, movable supports $o$ and $p$, and the rod $i^2$, connecting said supports with the bearing $b$, substantially as described.

10. The combination of the rotating and advancing spindle B, movable bearing $b$, that is actuated with the advance of the spindle, supports $o$ and $p$, connected with the bearing $b$, arm $f$, and rod $l^2$, substantially as described.

11. The spindle B, means, substantially as described, for longitudinally moving and revolving the same, the bottle-supports $o$ $o$, connected to said spindle to move longitudinally together therewith, and plug E on said spindle, combined with the jaws F, carried by said spindle, and means, substantially as described, for opening and closing said jaws while they revolve with said spindle, as specified.

12. The combination, with a rotating and advancing plug, E, adapted to enter a bottle-neck, of opening and closing jaws F, that are adapted to press upon the bottle-neck, as specified.

EDWARD H. EVERETT.

Witnesses:
CHARLES H. KIBLER,
EDWARD KIBLER.